United States Patent [19]

Kozlak

[11] Patent Number: 4,628,830
[45] Date of Patent: Dec. 16, 1986

[54] MICROWAVE DETECTION OF FUEL FLOW

[75] Inventor: Martin J. Kozlak, Tariffville, Conn.

[73] Assignee: Combustion Engineering, Inc., Windsor, Conn.

[21] Appl. No.: 826,948

[22] Filed: Feb. 7, 1986

[51] Int. Cl.[4] ............................................. F23H 5/18
[52] U.S. Cl. .................................... 110/186; 110/232; 241/34
[58] Field of Search ..................... 110/186, 232, 347; 241/33, 34, 35, 18

[56] References Cited

U.S. PATENT DOCUMENTS

| | | | |
|---|---|---|---|
| 3,822,828 | 7/1974 | Spitz | 241/33 |
| 4,518,123 | 5/1985 | Tanaka et al. | 110/232 X |
| 4,540,129 | 9/1985 | Zadiraka | 241/34 |
| 4,552,076 | 11/1985 | McCartney | 110/347 |

Primary Examiner—Edward G. Favors
Attorney, Agent, or Firm—David L. Smith

[57] ABSTRACT

A microwave transmitter irradiates each outlet pipe flow path of a coal pulverizer with a beam of electromagnetic energy at a microwave frequency. The microwave energy absorbed in each outlet pipe flow path is monitored and is proportional to the pulverized fuel flow therethrough. Knowing the fuel flow rate into the pulverizer, the fuel flow rate through each outlet pipe flow path may be determined. The portion of pulverized fuel flow exiting the pulverizer through a given pipe is determined as the ratio of microwave energy absorbed in each outlet pipe flow path to the average microwave energy absorbed in all outlet pipe flow paths of the pulverizer, multiplied by the fuel flow rate into the pulverizer divided by the number of outlet pipe flow paths.

12 Claims, 3 Drawing Figures

MICROWAVE DETECTION OF FUEL FLOW

BACKGROUND OF THE INVENTION

This invention relates to monitoring the fuel flow out of a pulverizer and more particularly, to a method and apparatus for real time monitoring of the fuel flow rate through the outlet pipes of a pulverizer.

Each pulverizer supplying coal to a furnace for combustion, typically supplies pulverized coal to each burner front of a single elevation of burners. In this manner as the demand for steam increases, an additional pulverizer may be placed in service to provide pulverized coal to an additional elevation of burners. Similarly, as the demand for steam decreases an elevation of burners as well as the pulverizer providing pulverized coal thereto may be removed from service.

Typically, single furnaces such as tangentially fired pulverized coal furnaces firing air entrained pulverized coal, are rectangular in cross-section with four burners per elevation; each burner is typically located at a corner of the furnace. The coal delivery pipes terminating at each burner front of an elevation originate at a single pulverizer. No two coal delivery pipes from a pulverizer are the same length or traverse the same path. Thus, no two coal delivery pipes inherently have the same pressure drop. To compensate for the differing pressure drops in the coal delivery pipes, orifices are placed in the outlet pipes of each pulverizer to provide a uniform pressure drop in each coal delivery pipe between a pulverizer and the burner fronts to which that pulverizer supplies pulverized coal. The presumption is that with a uniform pressure drop in each coal delivery pipe there will be an even transport air flow distribution among the coal delivery pipes and further that a uniform fuel flow distribution among the fuel delivery pipes will follow the uniform transport air flow distribution.

It is possible to achieve an even transport air distribution, yet not achieve a uniform fuel flow distribution. A non-uniform fuel flow distribution to the coal delivery pipes results in more or less coal being delivered to one or more of the burners than is delivered to the other burners. In turn, the stoichiometry of combustion is effected such that the corner or corners receiving more coal is/are fuel rich while the remaining corner or corners is/are fuel lean. This results in uneven combustion causing an uneven temperature distribution. The cause of uneven fuel flow distribution is not well understood. Uneven fuel flow distribution is thought to be influenced by many factors including air flow patterns internal to the pulverizer and the differing, circuitous paths each coal delivery pipe takes between the pulverizer and a burner front.

What is needed is a method and apparatus for monitoring the fuel flow through each coal delivery pipe of a pulverizer. Such a fuel flow detection system would provide a real time indication of the fuel flow through each coal delivery pipe and could be used just to monitor the fuel flow through each coal delivery pipe, to provide data for sizing a fixed orifice for each coal delivery pipe or in a feedback control system could be used to vary the cross-section of an orifice structure having movable elements that form a variable diameter orifice.

DESCRIPTION OF THE PREFERRED EMBODIMENT

Figure 1:
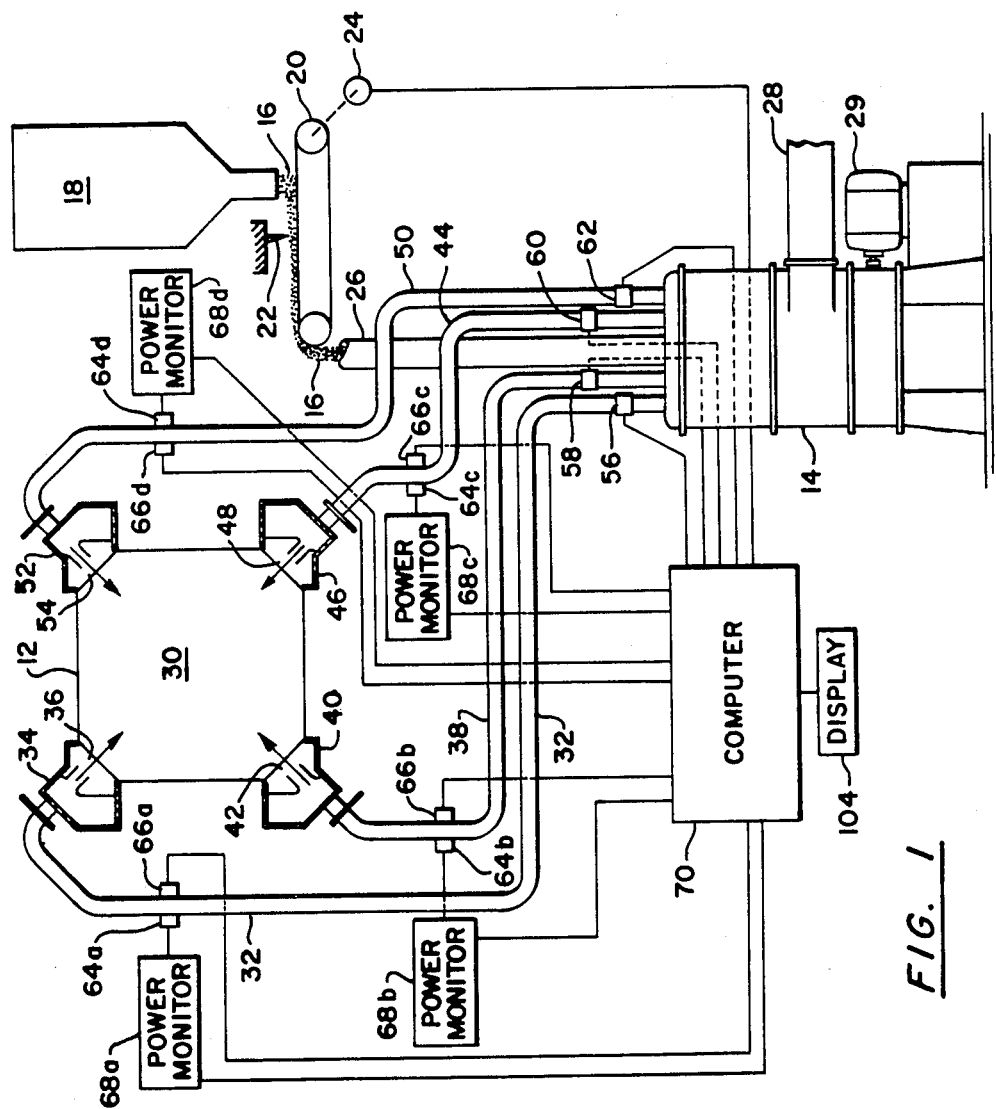
FIG. 1 is a schematic drawing of a pulverizer and associated fuel delivery pipes providing pulverized coal to an evation of burner fronts on a cross-section of a pulverized coal fired furnace, including a fuel flow detection system designed in accordance with the present invention.

Referring to the drawing, a pulverized coal fired furnace 12 being supplied with pulverized coal by a pulverizer has a fuel flow detection system 10 designed in accordance with the present invention. Moisture bearing coal 16 or other moisture bearing material to be pulverized, is gravity fed from storage bunker 18 onto weigh belt feeder 20 and spread thereon by spreader 22. The speed of weigh belt feeder 20 as monitored by tachometer 24 is indicative of the fuel flow into pulverizer 14 in pounds per hour as the relationship between feeder speed and unpulverized fuel flow rate is known and thereby provides means for monitoring the coal flow rate into the pulverizer.

Coal 16 passes from weight belt feeder 20 to pulverizer 14 inlet pipe 26 were coal 16 is further gravity fed to the interior of pulverizer 14. Within pulverizer 14, the coal passes between a grinding surface driven by motor 29 and a plurality of grinding rolls where the coal is crushed to a powdery consistence to increase the surface area available for chemical reaction during combustion.

Heated air for drying and transporting the pulverized coal 16 enters pulverizer 14 beneath the grinding surface at heated air inlet 28. The air passes upwardly through the interior of pulverizer 14 entraining pulverized coal 16 therein and conveying the entrained pulverized coal to a separator, typically internal to pulverizer 14, that recycles the more coarse particles of coal for further grinding. The finer particles of pulverized coal are carried along by the transport air stream into coal delivery pipes 32, 38, 44, and 50 to combustion chamber 30 of furnace 12.

Coal delivery pipe 32 extends between pulverizer 14 and burner 34 at corner 36 of a typical elevation of burners. Coal delivery pipe 32 delivers coal 16 pulverized in pulverizer 14 to the combustion chamber of furnace 12 through burner 34. Coal delivery pipe 38 extends between pulverizer 14 and burner 40 at corner 42. Coal delivery pipe 38 delivers coal pulverized in pulverizer 14 to the combustion chamber of furnace 12 through burner 40. Coal delivery pipe 44 extends between pulverizer 14 and burner 46 at corner 48. Coal delivery pipe 44 delivers coal pulverized in pulverizer 14 to the combustion chamber 30 of furnace 12 through burner 46. Coal delivery pipe 50 extends between pulverizer 14 and burner 52 at corner 54. Coal delivery pipe 50 delivers coal pulverized in pulverizer 14 to the combustion chamber 30 of furnace 12 through burner 52.

Although coal delivery pipes 32, 38, 44, and 50 all can be said to originate at pulverizer 14, each extends to a different corner, respectively, 36, 42, 48, and 54 of the same elevation of burners. None of the coal delivery pipes are of the same length and flow path and therefore, no two delivery pipes 32, 38, 44, and 50 inherently have the same pressure drop.

During start up of furnace 12, pulverizer air flow tests are run. The air flow tests are used to size orifices 56, 58, 60, and 62 which are placed respectively, in coal delivery pipes 32, 38, 44, and 50 resulting in a uniform pressure drop in all coal delivery pipes. A uniform air flow distribution in coal delivery 32, 38, 44, and 50 however, does not necessarily result in a uniform pulverized fuel flow distribution therein.

The coal being introduced into pulverizer 14 through inlet pipe 26 contains moisture. The total moisture content is comprised of two components: equilibrium moisture which is inherent in the coal and varies with coal, type rank and mine location as well as surface moisture which produces agglomoration of coal particles and which is the difference between the total moisture and the equilibrium moisture. Hereinafter, the moisture content of coal 16 will refer to the total moisture content of coal 16.

As indicated above, one of the functions of air introduced into pulverizer 14 through inlet 28 is to dry pulverized coal 16. As the heated transport air mixes with and fluidizes the pulverized coal in pulverizer 14, a portion of the moisture content of the coal is evaporated and that moisture becomes substantially evenly mixed within the air flow. The air flow distribution to coal delivery pipes 32, 38, 44, and 50 is substantially uniform due to inclusion of fixed orifices. The air flow distribution to each of the coal delivery pipes is not substantially affected by the non-uniform coal distribution to coal delivery pipes 32, 38, 44, and 50.

A fuel flow detection system designed in accordance with the present invention recognizes that the moisture content of coal entering pulverizer 14 remains substantially constant and when the moisture content changes it does not fluctuate rapidly. Even if rapid fluctuations in moisture occur, such as having a period of approximately one minute, the balance between the fuel lines is not affected since the fluctuations are simultaneously detected by all four detectors. Moisture changes in the incoming coal is recognized by monitoring pulverizer outlet temperature, feeder speed, air flow rate and air temperature into the pulverizer. Since pulverizer 14 has substantially no storage capacity except bowl load at start-up of a cold clean pulverizer, the coal flow rate out of pulverizer 14 is essentially the same as the coal flow rate into pulverizer 14. The heated air entering pulverizer 14 through inlet 28 has a uniform moisture content. With the transport air flow distributed uniformly among coal delivery pipes 32, 38, 44, and 50, a portion of the moisture in the mass flow passing through coal delivery pipes 32, 38, 44, and 50 is a attributable to the transport air, both the moisture content of the air prior to entering pulverizer 14 and the moisture that has evaporated from the pulverized coal thereby drying coal 16. This moisture content due to the transport air is substantially the same in each coal delivery pipe and remains substantially constant.

The balance of the moisture content in the mass flow passing through coal delivery pipes 32, 38, 44, and 50 is attributable to the pulverized coal passing therethrough. Although, the moisture content of the pulverized coal is substantially uniform, the total moisture content of the pulverized coal and transport air passing through coal delivery pipes, 32, 38, 44, and 50 varies because of the non-uniform coal flow distribution among the coal delivery pipes.

Applicant's invention detects the mass flow of the pulverized coal passing through each coal delivery pipe of pulverizer 14 by passing microwave radiation through the mass flow passing through each pipe and monitoring the amount of absorbed microwave energy in each delivery pipe. The amount of absorbed microwave energy is proportional to the mass flow through each coal delivery pipe. Knowing that the air flow through each coal delivery pipe is substantially uniform and that any variations are due to non-uniform coal flow distribution, as well as knowing the flow rate of non-pulverized coal into the pulverizer, the mass flow rate of pulverized coal through each coal delivery pipe can be computed in accordance with the following equation:

$$\dot{M}_i = \frac{(E_i)}{(\overline{E})} \frac{(M_t)}{(n)}$$

where, n is the number of pulverizer outlet pipe flow paths, i ranges from 1 to n, $E_i$ is the microwave energy absorbed by the mass flow passing through the $i^{th}$ outlet pipe flow path $\overline{E}$ is the average energy absorbed per outlet pipe flow path $$\overline{E} = \frac{1}{n} \sum_{i=1}^{n} E_i$$

$M_t$ is the total mass flow rate of unpulverized fuel into the pulverizer.

Even if there is a variation in the moisture content of the coal, a fuel detection system designed in accordance with the present invention will continue to yield accurate fuel flow rates, albeit there will be a slight time difference due to transport delay that can be predetermined between corresponding $\overline{E}$ and $M_t$ signals. This time difference can be accounted for by computer 70 in computing the fuel flow.

A microwave transmitter or emitter 64 and receiver 66 are mounted on a straight section of coal delivery pipe 32, 38, 44, and 50 with letter "a" designating those elements associated with coal delivery pipe 32 a letter "b" designating those elements associated with coal delivery 38, and letter "c" designating those elements associated with coal delivery pipe 44, and a letter "d" designating those elements associated with coal delivery pipe 50. A straight section of pipe is chosen to assure uniform pulverized coal distribution across the cross-section of the coal delivery pipe. In a preferred embodiment, transmitters 64 and receivers 66 are mounted in a vertical section of pipe. A vertical section of pipe is preferred to prevent fuel buildup in the region of the transmitter and the receiver that would cause a level of microwave absorption which in turn would yield inaccurate indication of fuel flow rate.

A strip emitter and receiver commensurate with the inside diameter of the coal delivery pipes may be used. A section of the coal delivery pipe in the region of emitters 64 and receivers 66 may be made of an abrasion resistant, non-metallic microwave permeable material.

The power consumed by emitter 64 is monitored by microwave power monitor 68 and is indicative of the microwave energy transmitted by emitter 64. Receiver 66 receives a portion of the microwave energy emitted by emitter 64 and generates a voltage directly proportional to the incident microwave radiation thereon. The difference between the energy emitted by emitter 64 and the energy absorbed by receiver 66 is assumed to be absorbed by the moisture content of the mass flow passing through each coal delivery pipe. Since moisture content of coal 16 entering pulverizer 14 is substantially constant and the air flow distribution among the coal delivery pipes is substantially uniform, any variation of energy absorbed by the moisture content of the mass flow passing through each coal delivery pipe is attributable to a change in the fuel flow rate passing therethrough.

Each microwave power monitor 68a, 68b, 68c, and 68d associated with pulverizer 14 provides an input through appropriate analog to digital conversion, if required, to an associated computer 70. Similarly, each microwave receiver 66a, 66b, 66c, and 66d as well as tachometer 24 provides an input through appropriate analog to digital conversion, if required, to computer 70.

Figure 2:
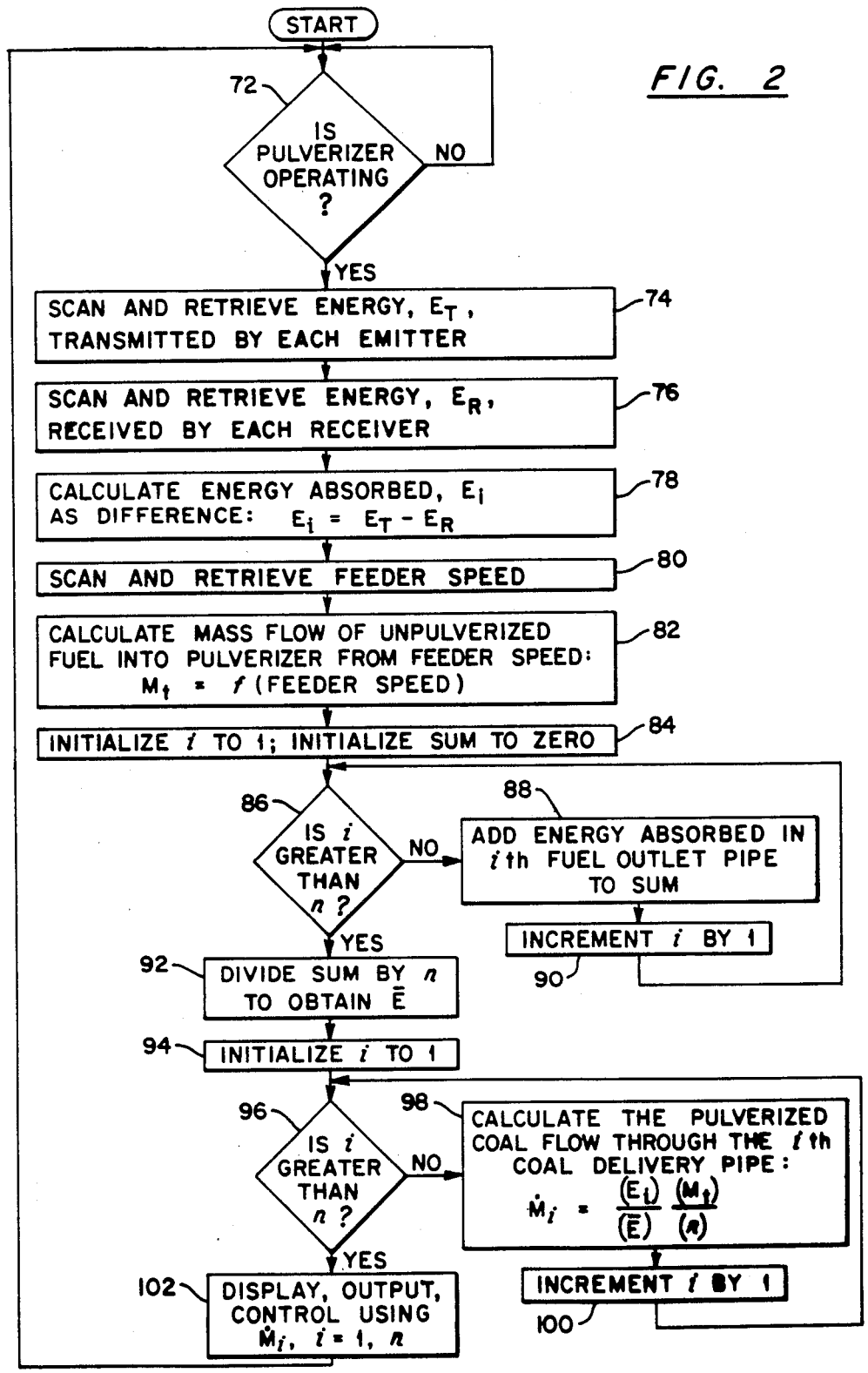
FIG. 2 is a flow chart for a computer or microprocessor for a fuel flow detection system in accordance with the present invention.

FIG. 2 illustrates a computer program flow chart for a fuel flow detection system designed in accordance with the present invention for a pulverizer having n coal delivery pipes. It is contemplated that n is greater than 1. With the pulverizer in service as determined by decision block 72, computer 70 scans to retrieve the power transmitted by each emitter 64a, 64b, 64c, and 64d in block 74. Computer 70 also scans to retrieve the power of received by each receiver 66a, 66b, 66c, and 66d in block 76. The microwave energy absorbed in each coal delivery pipe 32, 38, 44, and 50 is calculated in block 78 as the difference between the energy transmitted and the energy received. Computer 70 scans to retrieve the speed of weight belt feeder 18 in block 80 and calculates the mass flow of pulverized fuel entering pulverizer 14 as a predetermined function of feeder speed in block 82.

After initializing a counter to 1 that will count through n and initializing a sum to zero in block 84, the counter is checked in decision block 86 to determined whether the counter is greater than the number of coal delivery pipes. When the counter is less than the or equal to the number of coal delivery pipes, the energy absorbed in the coal delivery pipe designated by the counter is added to a running sum of energy absorbed by all of the coal delivery pipes in block 88. The counter is incremented in block 90 and the counter is then checked to determined if the energy absorbed by all all coal delivery pipes was summed. When the energy absorbed by all n coal delivery pipes is summed, that sum is divided by n in block 92 to determined the average energy absorbed in each coal delivery pipe.

The counter is again initialized to one in block 94 and compared to n in decision block 96 to determined whether the counter is grater than the number of coal delivery pipes. When the counter is less than or equal to the number of coal delivery pipes, the pulverized coal flow through the coal delivery pipe designated by the counter is calculated in block 98. The counter is incremented in block 100 and the counter is then checked to determine if the pulverized coal flow through all coal pipes has been calculated. When the pulverized coal flow through all n coal delivery pipes has been calculated, the pulverized coal flow through each coal delivery pipe is indicated such as on display 104. The pulverized coal flows are also available for use in a feedback control system or outputted in block 102 before computer 70, which may be a microprocessor, recycles to check on the operating status of the associated pulverizer and repeat the above sequence.

Each pulverizer in a multiple pulverizer system may have a fuel flow detection system in accordance with the present invention. Accordingly, each pulverizer may have a dedicated computer or microprocessor or one computer or one microprocessor may serve several pulverizers. Furthermore, a fuel flow detection system designed in accordance with present invention may be implemented using analog hardware.

As stated above, the pulverized fuel flow through each coal delivery pipe, once determined, may be used in a feedback control system. Having calculated both the average microwave energy absorbed in each coal delivery pipe and the actual microwave energy absorbed in each coal delivery pipe, the ratio of $E_i$ to $\overline{E}$ is indicative of the fuel flow through the $i^{th}$ coal delivery pipe. When the ratio $E_i/\overline{E}$ is unity, the pulverizer fuel flow through the $i^{th}$ coal delivery pipe is the average fuel flow through all n coal delivery pipe. When the ratio $E_i/\overline{E}$ is greater than unity, there is more pulverized fuel flow through the $i^{th}$ coal delivery pipe than the average coal delivery pipe and when the ratio $E_i/\overline{E}$ is less than unity, there is less pulverizer fuel flow through the $i^{th}$ coal delivery pipe than the average coal delivery pipe.

To attain a uniform fuel distribution among the coal outlet pipes of a pulverizer, the fuel flow through a coal outlet pipe having greater than the average pulverized fuel flow therethrough should be reduced. The inverse of $E_i/\overline{E}$, which is $\overline{E}/E_i$ may be used to control the actuator of a variable area orifice in the $i^{th}$ coal delivery pipe and in turn control the area of the orifice. Since $E_i/\overline{E}$ is greater than unity when more pulverized fuel is passing through the $i^{th}$ coal delivery pipe than is passing through an average coal delivery pipe, $\overline{E}/E_i$ will be less than unity and may be used as a control signal to the actuator of a variable area orifice to reduce the area of a variable orifice, thereby increasing the pressure drop in the coal delivery pipe in which the variable area orifice is mounted and reducing the pulverized coal flow therethrough. Similarily, since $E_i/\overline{E}$ is less than unity when there is less pulverized fuel flow the $i^{th}$ coal delivery pipe than the average coal delivery pipe, $\overline{E}/E_i$ will be greater than unity and may be used as a control signal to drive an actuator to increase the area of a variable area orifice thereby decreasing the pressure drop in the coal delivery pipe in which the variable area orifice is mounted and in turn increasing the pulverized coal flow therethrough.

Figure 3:
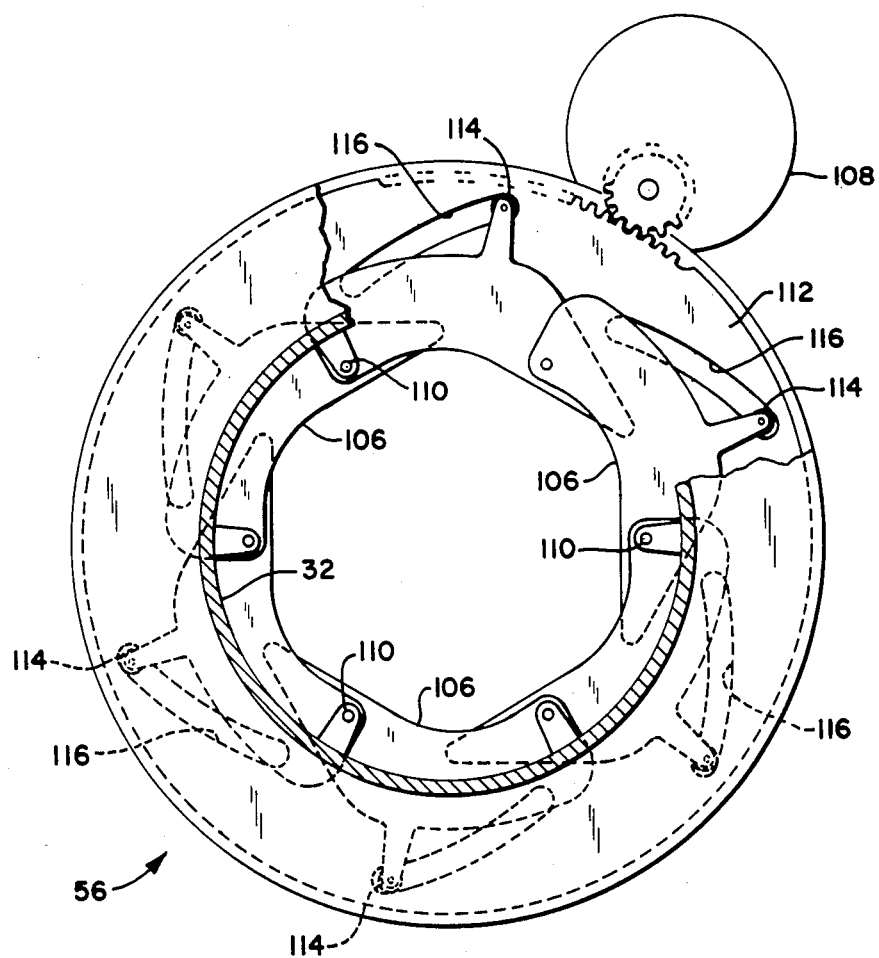
FIG. 3 is an actuator driven, variable area orifice for use with a control system employing the present invention.

A variable area orifice such as is shown in FIG. 3, would be similar to the variable area orifice disclosed in U.S. Pat. No. 4,459,922, the disclosure which is hereby incorporated by reference. However, as shown in FIG. 3, the variable area orifice would be actuated in a manner commensurate with an automatic feedback control signal. A variable area orifice 56 has movable elements 106 of the orifice structure that pivot at pivot point 110 inward or outward driven by actuator 108 to form a roughly uniform opening of variable diameter in response to a feedback control signal indicative of the fuel flow through the coal delivery pipe in which the orifice is mounted with the control signal passing through an appropriate digital to analog conversion, if required. Variable area orifice 56 has actuator 108 that drives disk 112 clockwise or counterclockwise to decrease or increase, respectively, the cross-sectional flow area within coal delivery pipe 32. As disk 112 is driven by actuator 108, keys 114 slide in keyways 116 causing movable elements 106 to pivot at pivot points 110 thereby decreasing on increasing the open area at the center of coal delivery pipe 32. The open area is available for transport air and pulverized flow therethrough and is manintaned roughly circular by the iris-like movable elements 106. Variable area orifice 56 is typical of variable area orifices 56, 58, 60, and 62.

I claim:

1. A method of determining the mass flow rate of moisture bearing pulverized fuel flowing through each outlet pipe flow path of a pulverizer, comprising the steps of:
   (a) passing unpulverized, moisture bearing fuel to a pulverizer;
   (b) monitoring the fuel flow rate of unpulverized fuel into the pulverizer;
   (c) grinding the fuel in the pulverizer;
   (d) supplying air to the pulverizer for partially drying the pulverized fuel and for transporting the pulverized fuel from the pulverizer;
   (e) distributing the pulverized fuel in a transport air stream to a plurality of outlet pipe flow paths;
   (f) transmitting microwave energy through each of the outlet pipe flow paths;
   (g) monitoring the microwave energy absorbed by the moisture bearing pulverized fuel and transport air passing through each of the plurality of outlet pipe flow paths;
   (h) evaluating the mass flow rate of moisture bearing pulverized fuel flowing through a pulverizer outlet pipe flow path in accordance with the relationship:

$$\dot{M}_i = \frac{(E_i)}{(\bar{E})} \frac{(M_t)}{(n)}$$

where,
n is the number of pulverizer outlet pipe flow paths, i ranges from 1 to n,
$E_i$ is the microwave energy absorbed by the mass flow passing through the $i^{th}$ outlet pipe flow path,
$\bar{E}$ is the average energy absorbed per outlet pipe flow path $$\bar{E} = \frac{1}{n} \sum_{i=1}^{n} E_i$$

$M_t$ is the mass flow rate of unpulverized fuel into the pulverizer.

2. A method as recited in claim 1 further comprising displaying the mass flow rate of pulverized fuel flowing through a pulverizer outlet pipe flow path.

3. A method as recited in claim 1 further comprising:
   (a) evaluating the ratio of average microwave energy absorbed per pulverizer outlet pipe flow path to the microwave energy absorbed by the moisture bearing pulverized fuel and transport air passing through each of the plurality of outlet pipe flow paths;
   (b) controlling a variable area orifice in response to the evaluated ratio in step (a).

4. A method as recited in claim 3 wherein the step of controlling a variable area orifice further comprises:
   increasing the open area of a variable area orifice upon the ratio of average microwave energy absorbed per pulverizer outlet pipe flow path to the microwave energy absorbed by the moisture bearing pulverized fuel and transport air passing through an outlet pipe flow path increasing to greater than unity;
   decreasing the open area of a variable area orifice upon the ratio of average microwave energy absorbed per pulverizer outlet pipe flow path to the microwave energy absorbed by the moisture bearing pulverized fuel and transport air passing through an outlet pipe flow path decreasing to less than unity;
   maintaining the open area of a variable area orifice upon the ratio of average microwave energy absorbed per pulverizer outlet pipe flow path to the microwave energy absorbed by the moisture bearing pulverized fuel and transport air passing through an outlet pipe flow path constant upon the ratio remaining unity.

5. A method as recited in claim 1 where the step of monitoring the microwave energy absorbed is comprised of the steps of:
   (a) monitoring the energy consumed by a microwave emitter associated with each outlet pipe flow path;
   (b) monitoring the microwave energy passing through each outlet pipe flow path; and
   (c) evaluating the energy absorbed by the moisture bearing pulverized fuel and transport air passing through each outlet pipe flow paths as the difference between the energy monitored in step (a) and the energy monitored in step (b).

6. A method as recited in claim 5 further comprising:
   (a) evaluating the ratio of average microwave energy absorbed per pulverizer outlet pipe flow path to the microwave energy absorbed by the moisture bearing pulverized fuel and transport air passing through each of the plurality of outlet pipe flow paths;
   (b) controlling a variable area orifice in response to the evaluated ratio in step (a).

7. A method as recited in claim 6 wherein the step of controlling a variable area orifice further comprises:
   increasing the open area of a variable area orifice upon the ratio of average microwave energy absorbed per pulverizer outlet pipe flow path to the microwave energy absorbed by the moisture bearing pulverized fuel and transport air passing through an outlet pipe flow path increasing to greater than unity;
   decreasing the open area of a variable area orifice upon the ratio of average microwave energy absorbed per pulverizer outlet pipe flow path to the microwave energy absorbed by the moisture bearing pulverized fuel and transport air passing through an outlet pipe flow path decreasing to less than unity; and
   maintaining the open area of a variable area orifice upon the ratio of average microwave energy absorbed per pulverizer outlet pipe flow path to the microwave energy absorbed by the moisture bearing pulverized fuel and transport air passing through an outlet pipe flow path constant upon the ratio remaining unity.

8. Apparatus for determining the mass flow rate of moisture bearing pulverized fuel flowing through each outlet pipe flow path of a pulverizer, comprising:

(a) a pulverizer flow pulverizing fuel having a plurality of outlet pipe flow paths (b) means for passing unpulverized, moisture bearing fuel to the pulverizer;

(c) means for monitoring the fuel flow rate of unpulverized fuel into the pulverizer;

(d) means for supplying air to the pulverizer for entraining the pulverized fuel therein, for partially drying the pulverized fuel and for transporting the pulverized fuel from the pulverizer through the plurality of outlet pipe flow paths thence to a furnace for combustion;

(e) means for transmitting microwave energy through each of the outlet pipe flow paths;

(f) means for monitoring the microwave energy absorbed by the moisture bearing pulverized fuel and transport air passing through each of the plurality of outlet fuel flow paths;

(g) means for evaluating the mass flow rate of moisture bearing pulverized fuel flowing through a pulverizer outlet flow path in accordance with the relationship $$\dot{M}_i = \frac{(E_i)}{(\overline{E})} \frac{(M_t)}{(n)}$$

where, n is the number of pulverizer outlet flow paths, i ranges from 1 to n, $E_i$ is the microwave energy absorbed by the mass flow passing through the $i^{th}$ outlet pipe flow path, $\overline{E}$ is the average microwave energy absorbed per outlet pipe flow path $$\overline{E} = \frac{1}{n} \sum_{i=1}^{n} E_i,$$

and $M_t$ is the mass flow rate of unpulverized fuel into the pulverizer.

9. Apparatus as recited in claim 8 further comprising means for displaying the mass flow rate of moisture bearing pulverized fuel flowing through a pulverizer outlet pipe.

10. Apparatus as recited in claim 8 further comprising:

means for evaluating the ratio of average microwave energy absorbed per pulverizer outlet pipe flow path to the microwave energy absorbed by the moisture bearing pulverized fuel and transport air passing through each of the plurality of outlet pipe flow paths and for generating a signal representative thereof;

a variable area orifice means disposed within one of the plurality of outlet pipe flow paths; and actuator means cooperatively associated with the variable area orifice means for receiving a signal representative of the ratio of microwave energy absorbed per pulverizer outlet pipe flow path to the microwave energy absorbed by the mass flow passing through the outlet pipe flow path in which the variable area orifice means is disposed and for controlling the variable area in response thereto.

11. Apparatus as recited in claim 8 wherein the means for monitoring the absorbed microwave energy further comprises:

means for monitoring the energy consumed by the microwave transmitting means associated with each outlet pipe flow path;

means for monitoring the microwave energy passing through each outlet pipe flow path; and means for evaluating the energy absorbed by the moisture bearing mass flow passing through each outlet pipe flow path as the difference between the energy consumed by the microwave transmitting means and the respective energy passing through each outlet pipe flow path.

12. Apparatus as recited in claim 11 further comprising:

means for evaluating the ratio of average microwave energy absorbed per pulverizer outlet pipe flow path to the microwave energy absorbed by the moisture bearing pulverized fuel and transport air passing through each of the plurality of outlet pipe flow paths and for generating a signal representative thereof;

a variable area orifice means disposed within one of the plurality of outlet pipe flow paths; and actuator means cooperatively associated with the variable area orifice means for receiving a signal representative of the ratio of microwave energy absorbed per pulverizer outlet pipe flow path to the microwave energy absorbed by the mass flow passing through the outlet pipe flow path in which the variable area orifice means is disposed and for controlling the variable area in response thereto.

* * * * *